UNITED STATES PATENT OFFICE.

JOSEPH SIMONS, OF LOS ANGELES, CALIFORNIA.

PROCESS FOR TREATING BRICKS AND OTHER ARTICLES FORMED OR CONSTRUCTED OF CLAY.

No. 829,177. Specification of Letters Patent. Patented Aug. 21, 1906.

Application filed July 18, 1905. Serial No. 270,285.

*To all whom it may concern:*

Be it known that I, JOSEPH SIMONS, of the firm of Simons Bros., in the city of Los Angeles, in the county of Los Angeles and State of California, have invented a certain new and useful Process for Treating Bricks and other Articles Formed or Constructed of Clay, of which the following is a full, clear, and exact description or specification.

My said invention, which relates to certain improvements in treating bricks and other articles formed or constructed of clay by firing molded clay in kilns or analogous structures, has for its object to change or alter the color of the clay as it appears after being fired and allowed to cool in the ordinary manner.

My invention has also for its object in addition to changing or altering the color of bricks or other articles formed of clay to render the bricks or other articles much more hard and durable than when not treated by or with the process constituting my present invention.

My invention consists as hereinafter described, and in operating the process of which it is constituted I proceed in the following manner: When bricks or other articles constituted of molded clay are completely fired in the kiln or other structure wherein the heat of combustion of the fuel used therein acts upon the bricks or other articles for a sufficient time to completely fire the same, then—that is to say, before the temperature of the kiln and its contents is sensibly lowered—the conduits, passages, or openings through which the atmospheric air has passed into the kiln during the time of firing to supply oxygen for entering into combustion with the fuel are completely closed, so that the further flow of oxygen into the kiln is entirely stopped, and when steam is used during the period of firing the flow of steam into the kiln is also at the same time shut off. The bricks or other articles fired in the kiln while still hot or at their highest temperature are then no longer exposed to the action of atmospheric air or steam, but are exposed solely to the action upon them of carbonaceous gases generated by the destructive distillation of any fuel which may be contained in the kiln unburned. A continuous and sufficient supply of carbonaceous gases is also maintained within the kiln by the heat therein acting upon either mineral oil, such as petroleum, being injected or otherwise admitted thereinto, so that the internal heat of the kiln and its contents vaporizes or converts into gas such mineral oil. Coal-tar, asphaltum, pulverized fuel—such as ground coal, bituminous shale, or dry sawdust or other carbonaceous gas-producing substance—may also be fed into the kiln, the heat of which without the presence of oxygen driving off carbonaceous gas therefrom without burning it. The kiln or like chamber or structure becomes in this manner charged with carbonaceous matter, which alone acts upon the fired bricks or other articles while they are at high temperatures.

The effect of maintaining the fired bricks or other articles of clay at a high temperature in the kiln immersed in hot carbonaceous gas and without the presence of atmospheric air or steam is not only to change the color of the bricks or other articles which have been fired to such color other than their natural fired color as may be desired—such, for example, as blue, crimson, deep red, and the like—but this exposure to the carbonaceous gases in the manner which has been described renders the bricks or other articles so treated much more hard and dense, besides being generally stronger, so that they are better adapted for use in buildings or other structures wherein either plain or ornamental bricks or blocks are used.

Having now described the nature of my said invention and the best system, mode, or manner whereby the same may be carried into practical effect, I desire to observe in conclusion that what I consider to be novel and original, and therefore claim as the invention to be secured to me by Letters Patent, is as follows:

The process consisting of stopping combustion of fuel in a brick-kiln during the operation of firing bricks or other articles formed of clay, while the kiln and its contents are at their highest temperature, by closing or shutting the passages through or by which atmospheric air and steam have been admitted to burn the carbonaceous fuel within the kiln during the operation of firing bricks or articles formed of clay, and after the air and steam have been shut off generating carbonaceous gas alone within the kiln by the residual heat therein, to which gas alone, that is to say, without air or steam the bricks or articles therein are exclusively exposed while the kiln and its contents are allowed to cool, substantially as hereinbefore set forth.

In testimony whereof I, the said JOSEPH SIMONS, have hereunto set my hand and seal in the presence of two subscribing witnesses.

JOSEPH SIMONS. [L. S.]

Witnesses:
 ST. JOHN DAY,
 J. D. CORY.